US008827521B1

(12) United States Patent
Rodriguez

(10) Patent No.: US 8,827,521 B1
(45) Date of Patent: Sep. 9, 2014

(54) ULTRA HIGH EFFICIENCY POWER SUPPLY

(75) Inventor: Edward T. Rodriguez, Wakefield, MA (US)

(73) Assignee: Solais Lighting, Inc., Stamford, CT (US)

( * ) Notice: Subject to any disclaimer, the term of this patent is extended or adjusted under 35 U.S.C. 154(b) by 540 days.

(21) Appl. No.: 13/027,240

(22) Filed: Feb. 14, 2011

Related U.S. Application Data

(60) Provisional application No. 61/304,894, filed on Feb. 16, 2010, provisional application No. 61/304,441, filed on Feb. 13, 2010.

(51) Int. Cl.
*B60Q 1/00* (2006.01)

(52) U.S. Cl.
USPC .......................................... 362/547; 362/548

(58) Field of Classification Search
USPC ........ 362/547, 548, 549; 315/32, 35, 36, 118, 315/200 R, 185 R
See application file for complete search history.

(56) References Cited

U.S. PATENT DOCUMENTS

| | | | | |
|---|---|---|---|---|
| 2008/0303444 | A1 * | 12/2008 | Chou et al. | 315/32 |
| 2009/0129111 | A1 * | 5/2009 | Ito et al. | 362/547 |
| 2009/0160344 | A1 * | 6/2009 | Hsu et al. | 315/117 |
| 2010/0172122 | A1 * | 7/2010 | Ramer et al. | 362/84 |

* cited by examiner

*Primary Examiner* — Minh D A
(74) *Attorney, Agent, or Firm* — Kristofer E. Elbing

(57) ABSTRACT

In one general aspect, the invention features an illumination source that includes a power supply having alternating current input lines and positive and negative direct current output lines. A string of light emitting diodes is connected in series between the positive and negative direct current output lines in a forward-biased series. A direct current cooling fan has a first input line and a second input line operatively connected across at least one of the light emitting diodes and has a cooling air delivery direction positioned to cool a surface in thermal contact with a heat generating portion of at least one of the power supply and the string of light emitting diodes.

18 Claims, 5 Drawing Sheets

ULTRA HIGH EFFICIENCY POWER SUPPLY

CROSS-REFERENCE TO RELATED APPLICATIONS

This application claims the benefit under 35 U.S.C. 119(e) of United States of two provisional applications entitled ULTRA HIGH EFFICIENCY POWER SUPPLY, Ser. No. 61/304,894, filed Feb. 16, 2010 and Ser. No. 61/304,441, filed Feb. 13, 2010, which are both herein incorporated by reference. This application is also related to the following co-pending applications: U.S. Ser. No. 61/270,315 entitled Dimmable Led Driver and Methods with Improved Supplemental Loading; U.S. Ser. No. 61/270,314 entitled Driving LEDS with Enhanced Single-Pole Dimming Stability; U.S. Ser. No. 61/270,312 entitled Cooling Solid State High-Brightness White-Light Illumination Sources; and U.S. Ser. No. 61/270,349 entitled Light Conditioning for High-Brightness White-Light Illumination Sources. These applications were all filed on filed Jul. 6, 2009 and are all herein incorporated by reference.

FIELD OF INVENTION

The invention relates generally to improvements in powering and cooling lamps based on Light Emitting Diodes (LEDs). In one general aspect it relates to a novel ultra-high-efficiency power regulation methodology in conjunction with an integral active cooling technique allows phase-control-dimmable AC-mains LED lamps intended for general illumination to achieve not only higher total light output but also higher lamp efficacy (lumens per watt).

BACKGROUND

There is considerable attention being given to the use of high brightness LED (HBLED) technology as a light source to replace traditional incandescent lamps. The catalyst for introduction of white LEDs, first as indicators, and later for viable commercial illumination sources, has primarily been due to development and refinement of blue-LED material-science processes, in conjunction with appropriate yellow-phosphor coatings for what is termed secondary emission.

The science of secondary emission has been long understood by those skilled in lighting technology and such science has previously provided the basis for all fluorescent and most other gaseous discharge lamps.

In such a process of secondary emission, monochromatic light, generated within a phosphor-coated LED chip, causes the phosphor to emit light of different wavelengths. This has resulted in white HBLEDs, with rating of up to a few watts and lumen outputs, depending on color temperature, exceeding 90-100 lumens per watt.

The mechanism is much like that in a gaseous discharge tube lamp where ultraviolet light excites the phosphor coating on the inside of an evacuated glass tube to create visible white light. Interestingly, many of the difficulties in refining the technology of white LEDs relate to the same issues experienced with gaseous discharge lamps in mastering phosphor composition and deposition processes to achieve consistency and desired performance.

The fundamentals of incandescent lamp design have changed little in the last 75 years. Similarly, the design and performance of fluorescent lamps have not changed substantially in the last 40 years. That is to say, both incandescent and fluorescent lamp processes are considered to be mature technologies, with very little gain in efficacy (i.e., lumens per watt) expected in the near future.

High brightness LED's, on the other hand, are experiencing some gain in efficacy each year as scientists refine techniques for light extraction from the chip and slowly master the composition and deposition of phosphors. When many of these factors are better understood in the future and efficacy is further improved (a projection accepted by most industry experts) the LED lamps will be far more easily accepted and many of the present challenges will be mitigated. Until that happens, however, there are compelling reasons to develop novel techniques to enhance what now exists so as to accelerate commercial viability.

Two factors are driving the substantial interest in white-emitting HBLEDs as a candidate to replace incandescent lamps in a large number of general illumination applications: longevity and energy conservation.

The typical white HBLED chip, generally rated from one to three watts, if used properly, is expected to have a useful operating life of over 50,000 hours, dramatically longer than the 750-2,000 hours of a typical incandescent lamp and much longer than the typical 6,000 hours of a compact fluorescent lamp. Readily available HBLEDs can exhibit efficacies of more than 90 lumens per watt, 6-10 times better than either a regular or quartz-halogen version of an incandescent lamp.

While there is significant saving in bulb replacement expense over a number of years, it is the saving in electricity costs which presents the most significant benefit. In conditions of near-continual operation, such as in restaurants, hotels, stores, museums, or other commercial installations, the electricity savings can provide a very favorable return on investment, even with relatively high purchase prices, in 18-24 months. The potential for rapid payback is much more evident than for other highly publicized "green" technologies" such as hybrid vehicles, wind turbines, solar power etc.

There is widespread acceptance that white-light LED sources are attractive as possible incandescent replacement lamps, especially in those types where the LED lamp is at its best, namely as reflector-type lamps such as PAR 30, PAR 38, or MR16. LEDs are by their nature directional light sources in that their light is emitted typically in a conical 120-150 degree beam angle, whereas an incandescent lamp tends to radiate in a near 360-degree spherical pattern and needs loss-inducing reflectors to direct light. Compact fluorescent lamps, because they are very difficult to collimate, are very inefficient when used as directional light sources.

The LED lamp starts out in a better position in spot or flood lamp applications because of its inherent directionality. In fixtures for ceiling downlighting, outside security, or retail merchandise highlighting, the need is for directional lighting, a factor taking advantage of the LED lamp's inherent emission characteristics. Those with a reasonable knowledge of physics know that a point source of light is best for use with a reflector or collimator. A CFL, being the virtual opposite of a point source, is poor in this respect. An incandescent filament is much smaller but still needs a good-sized reflector. An LED chip, being typically no larger than a millimeter on a side, lends itself to many more options with much smaller reflectors and collimating lenses.

Consequently, while white HBLEDs may alone, or as a partner with the compact fluorescent lamp (CFL), replace incandescent filament lamps, it is in the reflector lamps where the performance and economics of white LEDs appear likely to have the more immediate impact. While the CFL has become widely commercialized, the LED lamp does have certain advantages, which over the long term could give it a substantial marketing edge. Specifically, compared to a CFL, the LED lamp is a) more compatible with standard lamp dimming methodologies b) can more easily operate in low temperature, c) has no mercury content d) retains its efficacy when dimmed e) is essentially immune to shock and vibration and f) is immune to the degradation which CFL's experience with repetitive on/off cycling.

Even with the apparent advantages of the white HBLED lamp and its assumed inevitability as a commercially successful product category, there has yet to be an acknowledged product-leadership candidate; that is, a product which meets the performance and cost criteria necessary for early-adopter, sophisticated, commercial users to accept it on a large scale.

SUMMARY OF INVENTION

When a DC fan is used within an AC mains-operated lamp to cool a substrate to which LEDs are surface mounted, certain considerations should be addressed. First of all, a miniature DC fan typically needs to be powered from a 5 or 12V power supply. Other fan voltages are available but not likely with the availability, form factor or price needed. In any event, the voltage needed by the fan is likely to be different from that driving the LEDs.

This means that a DC voltage for the fans can be derived from a separate power supply or indirectly provided by the main LED power source and that voltage might vary from less than 10 volts to more than 100 VDC depending on the application. Furthermore, in a lamp being phase-control dimmable, the output voltage can change markedly. As a result, a means is needed to create a useful, stable, fairly constant low voltage for the fan in way which is relatively unaffected when dimming occurs.

The most straightforward way to achieve this objective is to derive the fan voltage through a linear regulator powered from the main LED power supply. Such an approach necessarily results in dissipation in the regulator, and at higher voltages the dissipation can become substantial, even at the lower currents of a fan. In an LED lamp, intended for general illumination where every percent of efficacy (lumens per watt) is extremely important, several watts lost in a regulator can be viewed as a major performance compromise since it can have the same effect as reducing LED efficacy by 5-10%.

Those skilled in the art of power supply design know that efficiency is one of the most significant characteristics of almost any power supply, whether a switching or linear type. It is also known that efficiencies over 90% are considered very high and generally difficult to achieve. Efficiencies over 95% in a DC circuit are generally considered unattainable.

Nonetheless, in the proposed invention it is an objective to achieve the equivalent of 100% efficiency by making use of an LED's attribute rarely, if ever, used in known prior art.

Referring to FIG. 1B, those skilled in circuit design are familiar with the use of a zener diode, in a back-biased mode, as a shunt regulator. Such a back-biased diode has a sharp knee and can provide a tightly regulated voltage reference. It is known that a simple 3-terminal linear regulator is also an inexpensive means to regulate a relatively low level of DC voltage but, like any zener diode circuit, this can create undesirable dissipation in an LED lamp circuit. Using one or more of the forward biased LED junctions to regulate the regulated fan voltage, however, can substantially reduce this power dissipation, even where the junctions act as very poor regulators in comparison to more traditional regulator circuits.

Let us assume, in a series string of LEDs, typically powered from constant-current power supply, that the current is adjusted from 100% down to zero. The total voltage across the LED series string, synonymous with the power supply output voltage, will drop no more than perhaps 40%. That means that the voltage across any individual LED will also drop no more than 40%, for a 100% to zero brightness level. If voltage is dropped any more from the supply, LED current ceases entirely. That is to say, the LED string is a non linear "component". When voltage is applied there will be no current but at some point, current will commence but the voltage drop will not increase proportionately with current.

The overall LED string and the individual LEDs actually have voltage/current voltage regulator characteristics. If for example a 12 volt DC fan is connected across several LEDs, representing a section of the series string operating at a substantially higher current than the normal fan operating current, they will act as a shunt regulator and provide the fan with the desired operating voltage. If a fan with wide operating range is chosen, the "poor" regulation of this LED regulator can in essence be 100% useful. Even if the output voltage is lowered as part of a downward-current dimming adjustment, the wide operating range of the fan will keep it operating. Moreover, even if the operating voltage dropped during dimming to where the fan stopped operating, the power level in the LEDs, and hence the generated heat, would be so low that fan air flow would be unnecessary In this arrangement, there can be virtually 100% efficiency. Current is not wasted but simply diverted from the LEDs to the fan. As long as the current to the fan is a small percentage of the overall LED current, the result will be no perceived effect on light output. What actually happens is that there is slight decrease in brightness in two or three of the many LEDs in a series string relative to those not used as regulators but then an overall increase in LED power because the power normally wasted in a regulator can now be apportioned back to all LEDs.

In a typical multi-LED lamp, the light output is the combination of all the LED outputs. In a collimated lens system, which all Par-type LED lamps are, the overlapping of collimated beam to create a single beam results in there being virtually no way to perceive that one or two LEDs might be emitting slight less than the others. This would be analogous to having seven adjacent trumpet players playing the same loud note, with one being 10% lower amplitude than the others and our trying to determine, from a distance, which one has a lower amplitude.

In a normal zener diode, series diode or linear regulator, the regulator's only role is to dissipate power as a means to regulate—It has no useful byproduct. The LED regulator on the other hand, generates 100% of its intended light as its dissipative product at it operating current and the current "borrowed" from it is doing 100% of its intended useful work—namely powering the fan. The result is a fan-voltage-regulating circuit which requires no additional components, dissipates no additional power, has zero additional cost and does not occupy any additional space.

In theory one could achieve similar efficiency objectives using a fan specified for 120 VAC mains voltage, thereby eliminating any need for an internal fan power supply of any kind. However, such AC fans typically 1) are considerably larger than low voltage DC fans of comparable air flow rating, 2) lack internal electronic circuitry to allow operating over a wide operating-voltage range 3) are rarely available with the very-long-life ball bearing or other bearing systems seen in small DC fans, 3) are available in only a limited number of configurations and 5) can result in having undesirably high line voltage (as high as 277VAC) in places on circuit boards or other places normally having low voltages.

In one general aspect, the invention features an illumination source that includes a power supply having alternating current input lines and positive and negative direct current output lines. A string of light emitting diodes is connected in series between the positive and negative direct current output lines in a forward-biased series. A direct current cooling fan has a first input line and a second input line operatively connected across at least one of the light emitting diodes and has a cooling air delivery direction positioned to cool a surface in thermal contact with a heat generating portion of at least one of the power supply and the string of light emitting diodes.

In preferred embodiments the power supply can be a constant current supply. The direct current cooling fan can be operatively connected across a subset of the light emitting diodes in the string. The direct current cooling fan can be operatively connected across a plurality of the light emitting diodes in the string. The direct current cooling fan can be operatively connected across a plurality of the light emitting diodes in the string. The power supply can be responsive to a dimmer. The fan can be positioned to cool a surface in thermal contact with a heat generating portion of each of the light emitting diodes. The fan can also be positioned to cool a surface in thermal contact with a heat generating portion of the power supply. The fan can be positioned to cool a surface in thermal contact with a heat generating portion of the power supply. The power supply can be operatively connected to a threaded conductive base for insertion into a screw-in household light socket.

In another general aspect, the invention features an illumination method that includes supplying a current, receiving the current through a string of forward-biased light emitting diodes, driving a fan motor with a voltage developed across at least one of the light emitting diodes, extracting heat derived from the supplied current with a moving surface of the fan, and using light from the light emitting diodes to illuminate an area.

In preferred embodiments the step of supplying current can supply a constant current. The step of driving can drive the fan motor with a voltage developed across a subset of the light emitting diodes in the string. The step of driving can drive the fan motor with a voltage developed across a plurality of the light emitting diodes in the string. The step of driving can drive the fan motor with a voltage developed across a subset of the light emitting diodes in the string. The method can further include changing an attribute of the current in response to a dimmer. The step of extracting can extract heat from the light emitting diodes. The step of extracting can also extract heat generated by the step of supplying. The step of extracting can extract heat generated by the step of supplying. The step of supplying a current can receive alternating current from a threaded screw-in household light socket.

DESCRIPTION OF AN ILLUSTRATIVE EMBODIMENT OF THE INVENTION

Figure 1B:
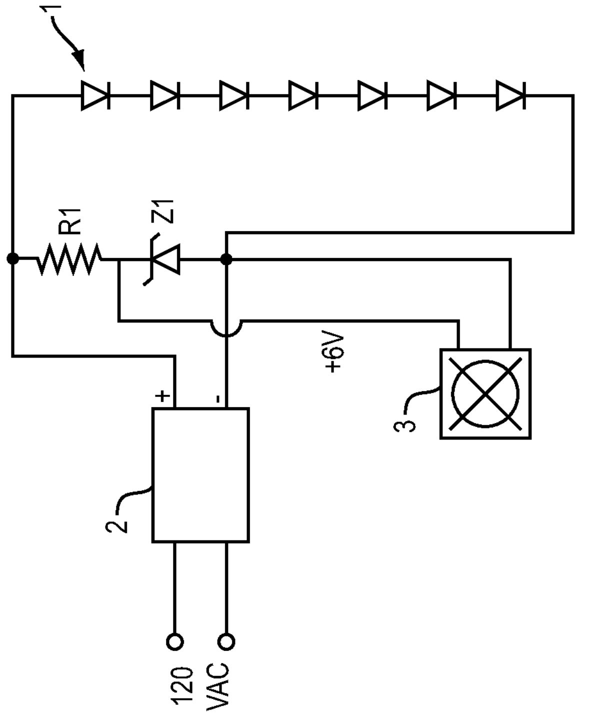
FIG. 1B shows an improved block diagram for an LED lamp control system
Figure 1A:
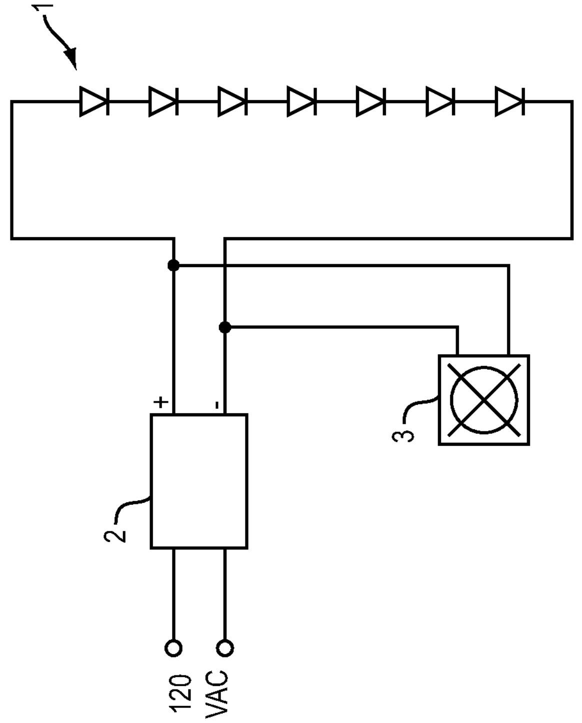
FIG. 1A shows a typical block diagram for an LED lamp control system

In a proposed embodiment, a number of high brightness LEDs are connected in series and mounted on a substrate, typically made of a laminated aluminum/polyimide/copper material known as a Metal Core Board (MCB), in a way that heat generated in the LED s during operation is transferred to the substrate. Heat is in turn transferred from the substrate to the surrounding air (i.e., ambient air) by means or directing air from a fan at or across the substrate FIG. 1A shows an LED circuit, 1, being driven by a constant current power supply 2 having a separate voltage output for powering the fan 3. This is the most straightforward way of providing fan voltage. A dual output power supply is almost always somewhat more expensive than a single output supply. Consequently, it is desirable to somehow drive the fan from the same output.

Figure 2:
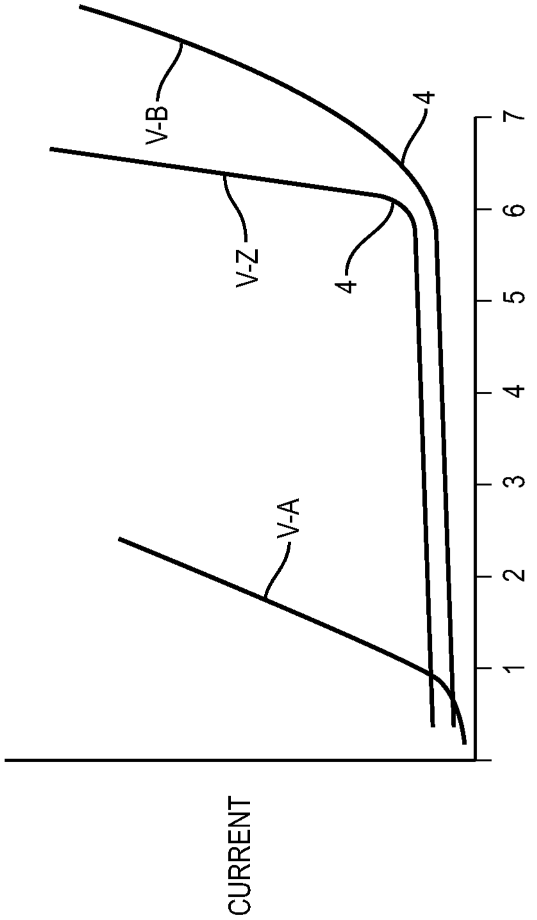
FIG. 2 shows the voltage-current characteristics of several regulation approaches

FIG. 2 shows the voltage-current characteristics of a single, forward-biased silicon diode, V-A, a series string of six forward-biased silicon diodes, V-B, and a back-biased zener diode V-Z, having a nominal 6 volt specification.

All of these configurations show a point, known as a “knee” 4, where the current starts to quickly increases. The forward biased diode or string of diodes exhibits a rounded knee while the zener diode exhibits a sharp knee. Such knee characteristics have long been understood by most circuit designers and will be excluded in this description for simplicity. Suffice it to say the forward biased diodes provide somewhat poor regulation of voltage while an appropriately selected zener diode can provide reasonably precise regulation.

Figure 3:
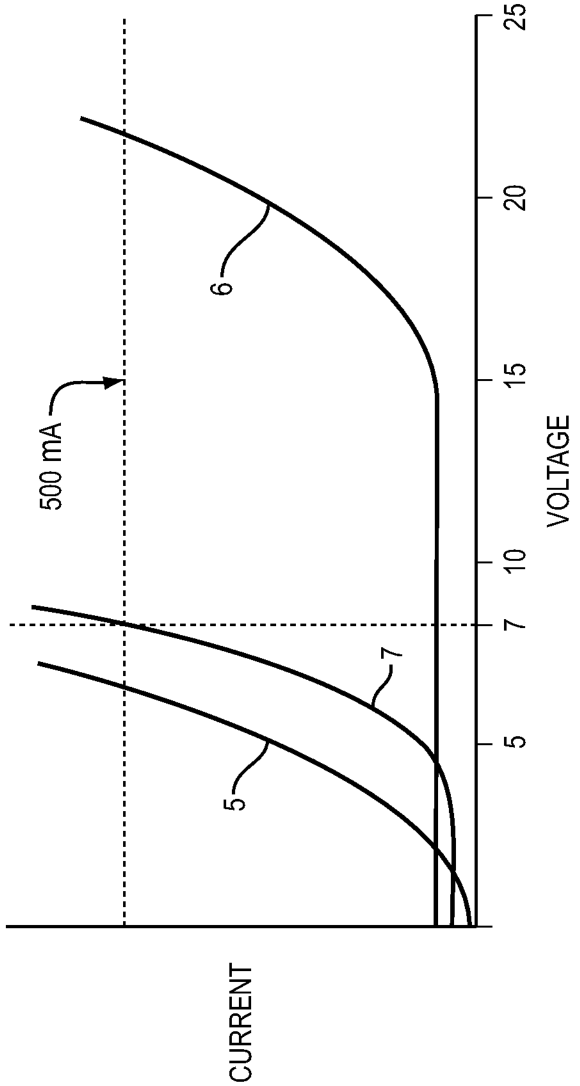
FIG. 3 shows typical LED operating characteristics

FIG. 3 shows the voltage-current characteristic of a high-brightness white LED 5 as well as a similar characteristic for a string of seven such LEDs 6. The curves are very much like those of the silicon diodes in FIG. 2 except that a single LED starts to conduct at about 2.5V instead of about 0.75V for a silicon diode, Therefore a series string exhibits a curve which is a multiple of what it might be for a single LED. It can be seen that the string starts to conduct at about 17.5V and by 500 mA has a total string voltage drop of about 24.5V. Each LED in the string has a proportional share of the total voltage drop. Also shown is the voltage across any two series-connected LEDs 7.

Figure 4:
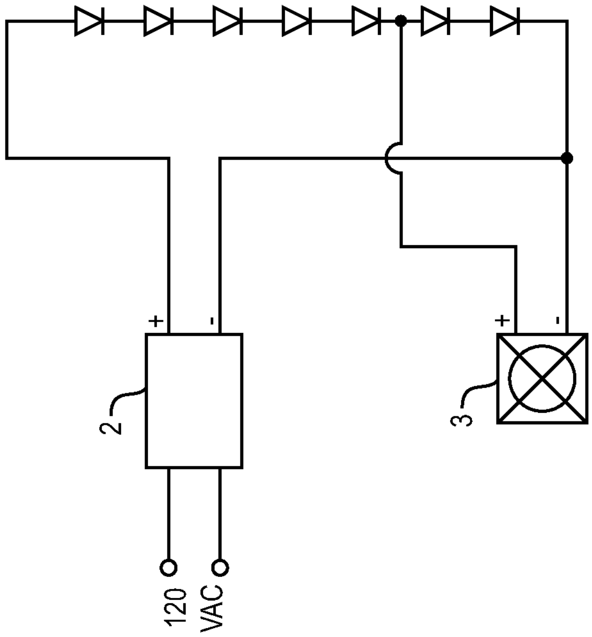
FIG. 4 shows a voltage regulation circuit for fan

FIG. 4 shows an embodiment of the proposed approach whereby the fan is connected across two of the LEDs. When the LEDs are operating at a current of approximately 500 mA, there will be a voltage of approximately 7 volts across them and applied at the same time to the fan. The fan act as a shunt impedance, diverting current, typically between 30-60, from those two LEDs.

If a fan with nominal 12V rating is chosen, and, as is typical, that fan has approximately a 5-14V operating voltage range, the fan will operate just fine at 7 volts. At the lower voltage, the fan will also be quieter and last longer. It turns out that reducing the fan voltage to almost half its nominal operating point will not significantly reduce the cooling effects since there is not a linear relationship between fans speed and the thermal-resistance-to-air change of an air-cooled heat source. In other words, while fan speed might, at 7 volts, be little more than half of that at 12V, the temperature rise of an appropriately designed heat sink in the path of the air flow, might only be increased by 10-20%

This lack of proportionality means that a few volts one way or the other in the fan voltage has little effect on temperature of the LED in other words, as long as the LED, acting as an imprecise regulator, keeps the fan volt “approximately” at 7 volts, everything is fine.

Figure 5:
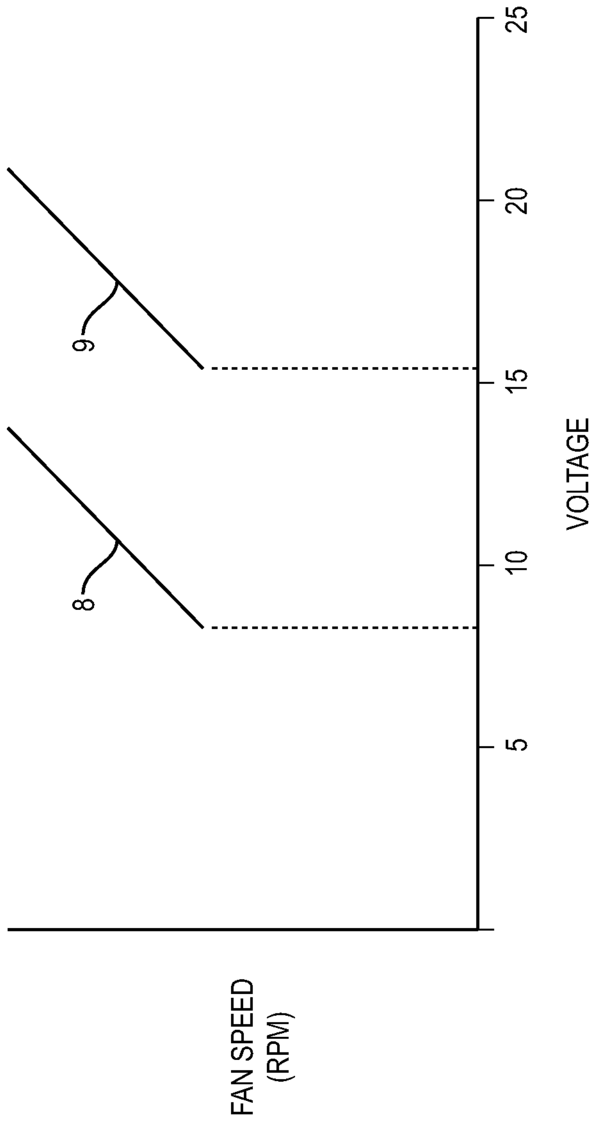
FIG. 5 shows fan operating characteristic

Should the lamp be under the control of a dimmer and the AC voltage is continually reduced, and the LED-string voltage similarly reduced, the fan will get slower and slower and, per FIG. 5, there will be a point 8, typically around 3-4V where the fan will “drop out” and just go off. As the fan gets slower and slower, there will of course concurrently be less and less LED heat to begin with and the reduced air flow will be of no consequence. FIG. 5 shows the dropout characteristics of the particular LEDs used as regulators as well as the companion total voltage 9 across the string In the design of the proposed embodiment, it is important to choose the appropriate combination of fan characteristics, operating LED string voltages, number and type of LEDs acting as the regulator section, dimming performance parameters and relationship of fan current to normal LED operating current.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. An illumination source, comprising:

a power supply having alternating current input lines and positive and negative direct current output lines, a string of light emitting diodes connected in series between the positive and negative direct current output lines in a forward-biased series, and a direct current cooling fan having a first input line, and a second input line operatively connected to a point within the string so that the direct current cooling fan is connected across a subset of the light emitting diodes, and having a cooling air delivery direction positioned to cool a surface in thermal contact with a heat generating portion of at least one of the power supply and the string of light emitting diodes.

2. The apparatus of claim 1 wherein the power supply is a constant current supply.

3. The apparatus of claim 1 wherein the direct current cooling fan is operatively connected across a plurality of the light emitting diodes in the string.

4. The apparatus of claim 1 wherein the power supply is responsive to a dimmer.

5. The apparatus of claim 4 wherein the direct current cooling fan is operatively connected across a plurality of the light emitting diodes in the string.

6. The apparatus of claim 1 wherein the fan is positioned to cool a surface in thermal contact with a heat generating portion of each of the light emitting diodes.

7. The apparatus of claim 6 wherein the fan is also positioned to cool a surface in thermal contact with a heat generating portion of the power supply.

8. The apparatus of claim 1 wherein the fan is positioned to cool a surface in thermal contact with a heat generating portion of the power supply.

9. The apparatus of claim 1 wherein the power supply is operatively connected to a threaded conductive base for insertion into a screw-in household light socket.

10. An illumination method, comprising supplying a current, receiving the current through a string of forward-biased light emitting diodes, driving a fan motor with a voltage developed across a subset of the light emitting diodes in the string that is smaller than a voltage developed across the whole string, extracting heat derived from the supplied current with a moving surface of the fan, and using light from the light emitting diodes to illuminate an area.

11. The method of claim 10 wherein the step of supplying current supplies a constant current.

12. The method of claim 11 wherein the step of driving drives the fan motor with a voltage developed across a subset of the light emitting diodes in the string.

13. The method of claim 10 wherein the step of driving drives the fan motor with a voltage developed across a plurality of the light emitting diodes in the string.

14. The method of claim 10 further including changing an attribute of the current in response to a dimmer.

15. The method of claim 10 wherein the step of extracting extracts heat from the light emitting diodes.

16. The method of claim 15 wherein the step of extracting also extracts heat generated by the step of supplying.

17. The method of claim 10 wherein the step of extracting extracts heat generated by the step of supplying.

18. The method of claim 10 wherein the step of supplying a current receives alternating current from a threaded screw-in household light socket.

* * * * *